(12) United States Patent
Solkesz et al.

(10) Patent No.: US 8,494,768 B2
(45) Date of Patent: Jul. 23, 2013

(54) NAVIGATION SYSTEM, METHOD AND DATABASE USING MOBILE DEVICES

(75) Inventors: Renske Elizabeth Solkesz, Middlesex (GB); Thomas Visser, Middlesex (GB)

(73) Assignee: Samsung Electronics Co., Ltd (KR)

( * ) Notice: Subject to any disclaimer, the term of this patent is extended or adjusted under 35 U.S.C. 154(b) by 500 days.

(21) Appl. No.: 12/533,553

(22) Filed: Jul. 31, 2009

(65) Prior Publication Data
US 2010/0030465 A1 Feb. 4, 2010

(30) Foreign Application Priority Data

Jul. 31, 2008 (GB) .................................. 0814029.5
Jul. 14, 2009 (KR) ........................ 10-2009-0063974

(51) Int. Cl.
*G06F 19/00* (2006.01)
*H04B 10/00* (2006.01)

(52) U.S. Cl.
USPC ........................................ 701/527; 340/989

(58) Field of Classification Search
USPC ................. 701/209, 201, 202, 210, 211, 213, 701/200, 527; 340/995.13, 995.15, 995.12, 340/988, 989, 990, 995.1; 455/423, 446, 455/67.1, 447
See application file for complete search history.

(56) References Cited

U.S. PATENT DOCUMENTS

| | | | |
|---|---|---|---|
| 6,522,971 B1 * | 2/2003 | Tanaka ........................... | 701/209 |
| 6,801,851 B2 * | 10/2004 | Kawakami ..................... | 701/209 |
| 6,839,623 B1 * | 1/2005 | Tillgren et al. ................ | 701/200 |
| 7,271,742 B2 * | 9/2007 | Sheha et al. ............. | 340/995.24 |
| 7,286,837 B2 * | 10/2007 | Giniger et al. .............. | 455/456.3 |
| 7,302,465 B2 * | 11/2007 | Ayres et al. .................... | 709/203 |
| 7,474,896 B2 * | 1/2009 | Mohi et al. .................. | 455/456.1 |
| 7,565,155 B2 * | 7/2009 | Sheha et al. ............... | 455/456.1 |
| 7,680,594 B2 * | 3/2010 | Cabral et al. .................. | 701/209 |
| 7,710,290 B2 * | 5/2010 | Johnson ........................ | 340/8.1 |
| 7,856,315 B2 * | 12/2010 | Sheha et al. .................. | 701/209 |
| 7,908,080 B2 * | 3/2011 | Rowley et al. ................ | 701/209 |
| 7,912,179 B2 * | 3/2011 | Gertner et al. ................... | 378/65 |
| 2002/0047787 A1 | 4/2002 | Mikkola et al. | |
| 2002/0118118 A1 | 8/2002 | Myllymaki et al. | |
| 2005/0085994 A1 | 4/2005 | Kimura | |
| 2007/0073474 A1 | 3/2007 | Nakamura | |
| 2007/0124064 A1 | 5/2007 | Fukui et al. | |
| 2007/0281689 A1 | 12/2007 | Altman et al. | |
| 2008/0177469 A1 * | 7/2008 | Geelen et al. ................. | 701/209 |
| 2008/0177709 A1 | 7/2008 | Chiu et al. | |
| 2009/0098907 A1 * | 4/2009 | Huntzicker et al. ....... | 455/556.1 |
| 2009/0105947 A1 * | 4/2009 | Nachesa et al. ............... | 701/209 |

(Continued)

FOREIGN PATENT DOCUMENTS

WO WO 2004/003705 1/2004

*Primary Examiner* — Ronnie Mancho

(74) *Attorney, Agent, or Firm* — The Farrell Law Firm, P.C.

(57) ABSTRACT

Provided is a navigation system for guiding a user of a mobile device to a plurality of locations including a storage means adapted to store a database comprising a plurality of records, each record comprising location data indicative of the location of a respective place; a mobile device; a location determination means adapted to determine a current location of the mobile device; and a processing means adapted to use the database and current location to select, according to at least one predetermined criterion, a location that the user is directed towards, wherein the mobile device is adapted to provide the user with an indicator arranged to direct the user to the selected place.

29 Claims, 10 Drawing Sheets

U.S. PATENT DOCUMENTS

| | | | |
|---|---|---|---|
| 2009/0150073 A1* | 6/2009 | Caraballo | 701/210 |
| 2009/0171559 A1* | 7/2009 | Lehtiniemi et al. | 701/201 |
| 2009/0203387 A1* | 8/2009 | Wold et al. | 455/456.3 |
| 2009/0216431 A1* | 8/2009 | Vu et al. | 701/201 |
| 2010/0035637 A1* | 2/2010 | Varanasi et al. | 455/457 |

* cited by examiner

| ENTRY | PLACE | LOCATION | CATEGORY | COMMENTS | DATE/TIME OF ENTRY |
|---|---|---|---|---|---|
| 1 | P1 | x1, y1 | a | - | T1 |
| 2 | P1 | x1, y1 | b | - | T2 |
| 3 | P2 | x2, y2 | b | - | T3 |
| 4 | P3 | x3, y3 | a | - | T4 |
| 5 | P4 | x4, y4 | c | - | T5 |
| 6 | P5 | x5, y5 | d | - | T6 |

FIG.2

NAVIGATION SYSTEM, METHOD AND DATABASE USING MOBILE DEVICES

PRIORITY

This application claims priority under 35 U.S.C. §119(a) to an application entitled "Navigation System, Method and Database" filed in the UK Intellectual Property Office on Jul. 31, 2008, and assigned Serial No. 0814029.5, and to an application filed in the Korean Industrial Property Office on Jul. 14, 2009, and assigned Serial No. 10-2009-0063974, the contents of which are incorporated herein by reference.

BACKGROUND OF THE INVENTION

1. Field of the Invention

The present invention generally relates to navigation systems for guiding users of mobile devices to places, and in particular, although not exclusively, to systems for guiding users of mobile phones to places of potential interest selected from a database.

2. Description of the Related Art

It is increasingly common for people to carry mobile communication devices, such as mobile phones, personal digital assistants, etc., during both business and leisure time. Users of such devices do not have a simple convenient way of providing information on their current location to other people via their mobile devices. It is possible for a user of a mobile device, such as a mobile phone, to send a text message to a friend or colleague, including information about the user's present location. Similarly, the user may perform a voice call with the mobile device to provide location information. However, neither of these methods is particularly simple and convenient.

Furthermore, when people stroll through an urban environment (for example, when they are tourists in a particular environment) their mobile devices provide no support for their wandering behavior. Although the mobile devices are there to be used to send or receive calls or messages, these functions are separate from and unrelated to the movement of the user around the environment.

When moving through an environment, users may carry a map, enabling them to know exactly their location and where they are going. However, if a user does not have a map and instead carries a mobile phone in accordance with the prior art, the user may be completely aware of the user's current location and indeed where the user is going.

Several currently existing social networking websites enable people to share information on their movements and experiences with others. Typically, however, these websites require HyperText Transfer Protocol (HTTP)-access, log in procedures, and an extensive amount of text entry to share information and experiences with others.

Mobile navigation systems, particularly for in-car use, are known which provide a user with information on the current location and direction information to guide a user towards a location specified by the user. Such systems typically determine the current location from Global Navigation Satellite Systems (GNSS) such as the Global Positioning System (GPS) system.

For a user already carrying a mobile device, such as a mobile phone, it is inconvenient, cumbersome, and generally undesirable to carry a satellite navigation unit, such as a car satellite navigation (i.e., "sat-nav") unit, to guide the user as a pedestrian. Furthermore, such sat-nav systems are primarily aimed at directing a user to a particular destination selected in advance by the user, and so may be considered inappropriate if a user is just wandering, for example exploring a region on foot as a tourist.

SUMMARY OF THE INVENTION

It is an aim of the invention to solve, mitigate or obviate, at least one of the problems and/or disadvantages associated with the prior art. The embodiments aim to provide at least one of the advantages described below.

According to a first aspect of the invention there is provided a navigation system for guiding a user of a mobile device to a plurality of places. The system includes a storage means adapted to store a database including a plurality of records, each record including location data indicative of the location of a respective place; a mobile device; a location determination means adapted to determine a current location of the mobile device; and a processing means adapted to use the database and current location to select, according to at least one predetermined criterion, a said place to direct a user to, wherein the mobile device is adapted to provide a user with an indication arranged to direct the user to the selected place.

Another aspect of the present invention provides a navigation method for guiding a user of a mobile device to a plurality of places, the method including storing a database including a plurality of records, each record including location data indicating of a location of a respective place; determining a current location of the mobile device; using the database and current location to select, according to at least one predetermined criterion, a place to direct the user of the mobile device towards; and using the mobile device to provide the user with an indicator to direct the user to the selected place.

Another aspect of the present invention provides a mobile device including a location determination means adapted to determine a current location of the mobile device; a user interface means adapted to provide a user with an option to make an entry, corresponding to said current location, in a database; and a input means operable by a user to select said option, wherein the mobile device transmits, in response to a user selecting said option, data for remote reception and entry into a database, the transmitted data including location data indicating the current location.

Another aspect of the invention provides a method of operating a mobile device, the method including operating the mobile device to determine a location of a place to which the mobile terminal has been taken; providing, by the mobile device, a user with an option to create an entry, corresponding to said place, in a database; operating an input means of the mobile device to select said option; and transmitting data from the mobile device for remote reception and entry into a database, the transmitted data including location data indicating the current location.

Another aspect of the present invention provides a method of generating a database for use in a navigation system for guiding a user of a mobile device to a plurality of places, the method including determining the location of a place to which the mobile terminal has been taken; and using the mobile device to make an entry in said database, the entry including location data indicating the location of the place.

Another of the present invention provides a database generated using a method as defined above, and further another aspect of the invention provides the use of such a database to guide a user of a mobile device to a place.

Another aspect of the invention provides a computer program including instructions arranged, when executed, to implement the above-described methods. Another aspect of the invention provides a machine-readable storage for storing a program as defined above.

BRIEF DESCRIPTION OF THE DRAWINGS

Embodiments of the invention will now be described with reference to the accompanying drawings, of which:

FIG. 2 is a representation of a database produced according to an embodiment of the present invention;

DETAILED DESCRIPTION OF EMBODIMENTS

Figure 1:
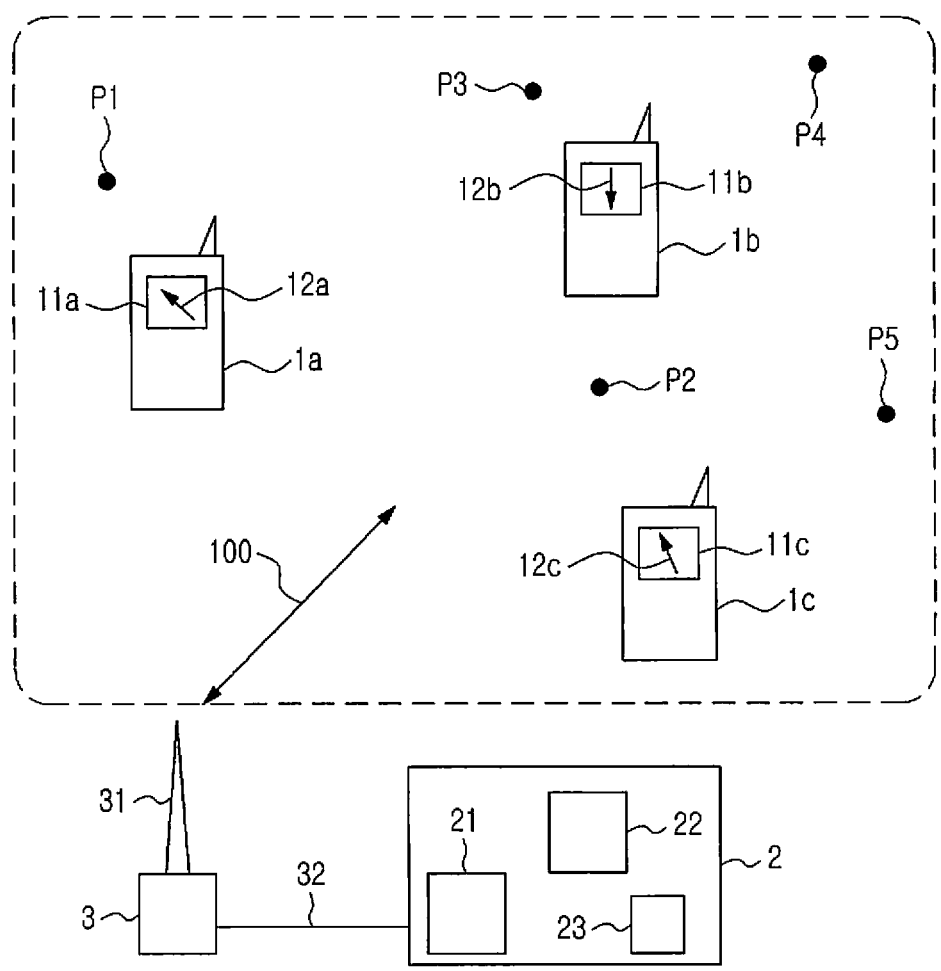
FIG. 1 is a schematic representation of a navigation system according to an embodiment of the present invention.

According to a first aspect of the invention there is provided a navigation system for guiding a user of a mobile device to a plurality of places. The system includes a storage means adapted to store a database including a plurality of records, each record including location data indicative of the location of a respective place; a mobile device; a location determination means adapted to determine a current location of the mobile device; and a processing means adapted to use the database and current location to select, according to at least one predetermined criterion, a said place to direct a user to, wherein the mobile device is adapted to provide a user with an indication arranged to direct the user to the selected place.

Thus, in contrast to in-car sat-nav systems where a user has to pre-select a destination to be directed to, in the navigation system according to this first aspect of the invention a user of the mobile device is automatically provided with directions to a place selected by the processing means from the database according to at least one predetermined criterion. For example, the selected place may belong to a category in which the user has registered an interest (such as museums) and as the user moves around he or she can then automatically be alerted to the presence of, and indeed directed to the location of a nearby museum of which he or she was unaware. It will therefore be appreciated that a system embodying this aspect of the invention is able to greatly enhance a user experience as the user moves around an environment.

In certain embodiments of the present invention, the storage means may be entirely separate from and external to the mobile device, for example, being included in a remote server or other remote apparatus with which the mobile device can communicate using wireless signals. This communication can be provided by any convenient means, for example, by a communication system or network including an array of base stations or Node Bs.

In certain embodiments of the present invention, however, the storage means may be partly external to the mobile device and partly included in the mobile device itself. In yet further embodiments, the storage means may be included entirely within the mobile device.

In embodiments of the present invention in which the storage means is external to the mobile device, the mobile device may include additional storage means adapted to store a copy of at least part of the database. The mobile device may be adapted to download a copy of all or part of the database from the main storage means. For example, the main database may be very large and cover a vast region or indeed a number of regions. In such cases, the mobile device may be arranged to download and locally store just a portion of the main database corresponding to the current locality of the mobile device (e.g. a particular town, city, or district). Then, the mobile device may itself perform the processing to select a place from that downloaded part of the database to direct the user to.

The processing means may be external to the mobile device, be partly external to the mobile device and partly included in the mobile device, or indeed be entirely included within the mobile device, depending on the particular embodiment of the present invention. In cases where the processing means is external to the mobile device, a signal identifying at least the location of the selected place is transmitted to the mobile device so that the mobile terminal can then provide the appropriate direction or directions to the user.

In certain embodiments of the present invention, the location determination means includes means external to the mobile device for tracking the device and determining where the mobile terminal is at any particular time. However, in alternative embodiments, the mobile device may itself be able to determine its own current location. For example, in certain embodiments the mobile device includes a GNSS receiver (e.g. a GPS receiver) adapted to receive navigation signals from a plurality of satellites and GNSS processing means (such as a GPS processor) adapted to determine the current location of the mobile device from the received navigation signals.

In certain embodiments of the present invention, each record in the database may include just location data indicating the location of each place to which the mobile device user can be directed. However, in alternative embodiments, each record may include additional data, such as category data indicative of a category allocated to the respective place. For example, the category data may be used to indicate whether the place is somewhere to eat, drink, shop, or is a place to see (i.e., whether the place is an attraction, such as a museum, a statue, a building of historical interest, etc). These categories are merely examples and other categories may be used in alternative embodiments of the present invention. For example, additional categories may be used to indicate transport services, stations, transport stops, theatres, cinemas and hotels. In certain embodiments of the present invention, the user of the mobile device is able to set (or pre-register) certain preferences, indicating which category or categories of place he or she wishes to be directed to. Thus, the user may be on a sightseeing tour, and may only wish to be directed to museums for a particular period. The system is able to automatically take into account this preference, and as the user moves around a city, for example, he or she can be directed from one museum to the next. The user may be able to alter these preferences at any time. Thus, after a period of museum visiting, a user may wish to find a restaurant. By selecting a restaurant category the system is then able to provide directions to suitable nearby establishments. In certain embodiments of the present invention, a user may be able to make selections within sub-categories, such as restaurants of a particular type.

In certain embodiments the at least one predetermined criterion includes at least one of a determination of whether a place is within a predetermined distance of the current location; whether the current location is within a predetermined distance of a place; whether the current location is within a defined area around a place; whether a place is within a particular category or categories; whether a place satisfies one or more preferences set by a user of the mobile device.

For example, the processing means may be adapted to search the database for places within, for example, 200 meters of the user's current location such that the user is directed to a place or places very close by. A user may set, for example, the predetermined distance. Thus, if the user is willing to go further out of their way to find a restaurant or bar or visit a place of interest, a larger threshold distance can be set.

In systems using the selection criterion of whether the current location is within a predetermined distance of a place, the predetermined distance need not necessarily be the same for all places. For example, if a place is particularly recommended or recommendable, such as a place of outstanding historical interest, then its range of influence can be set very high so that mobile device users may be directed to it from relatively far away. Conversely, if a place is of relatively minor interest, or has not received many recommendations, the predetermined distance used by the processing means can be relatively small so that only users passing very close by are directed to it. In certain embodiments, rather than simply looking for whether the current location is within a predetermined distance of a place, the processing means may determine whether the current location is within a defined area around a place. This area is not necessarily circular (which would pull users in equally from all directions).

Instead, it may have another shape, determined for example by taking into account accessibility to it (determined by roads, paths, rivers, bridges, etc). Thus, although a user may be within 50 meters of a particular attraction, the system may not direct a person to that attraction if a river or other barrier lies between the user's current location and the attraction.

As mentioned above, another criteria that can be used by the processing means to determine whether to select a place from the database to direct a user to is whether that place lies within a category or categories in which the user has registered an interest.

In general, in certain embodiments of the present invention, users may be able to set or enter one or more preferences via their mobile devices, and the system can take these preferences into account in determining which places from the database to direct the user to.

A wide variety of types of indication may be used to direct the user to the selected place or places. For example, in certain embodiments the indication includes at least one of a textual indication and a graphical indication. An example of a textual indication is "museum; 100 meters ahead" and an example of a graphical indication is an arrow on a screen of the mobile device.

In certain embodiments of the present invention, the indication provided by the mobile device is indicative of both the direction and distance of the selected place from the current location. For example, the indication may include a visible component having a size dependent upon the distance of the selected place from the current location (that visible component could be a circle, having a diameter dependent upon the distance) and a visible component indicating the direction of the selected place from the current location (this could be an arrow, line, or other pointer extending from the variable-size circle). An advantage of such indicators is that they provide simple and easy to interpret representations to guide the user to the selected place.

In certain embodiments of the present invention, the mobile device further includes a navigation system in accordance with any preceding claim, wherein the mobile device further includes a user interface means adapted to provide a user with an option to make an entry, corresponding to said current location, in the database; and input means operable by a user to select said option, wherein the mobile device is adapted, in response to a user selecting said option, to transmit data for remote reception and entry into the database, the transmitted data includes location data indicative of said current location.

This creation of an entry corresponding to the current location may also be referred to as tagging the current location. These features enable the user to contribute to the database. The user is thus able to share his or her experiences with others via the system, and other mobile device users are able to benefit from those experiences. The database, in certain embodiments of the present invention, may be constructed entirely from entries provided by respective mobile device users. In such examples, the database thus represents the accumulated experiences and recommendations of a number of users. A particular mobile device user can then be guided around an environment by the experiences and recommendations of others. In alternative embodiments, the database may be partly constructed from entries made by mobile device users, the remainder being preset or determined by some other means.

In certain embodiments of the present invention, the input means is further operable by a user to input and/or select additional data corresponding to the current location (in other words corresponding to the place having the current location), the transmitted data including this additional data. Thus, rather than simply tagging or flagging up a particular location, a user of the mobile device may be able to enter additional information, such as a category the user wishes to allocate to the location or place (for example, the user may indicate that a good Italian restaurant is found at that location) or indeed the user can enter other information such as a level of recommendation or a rating for the place (e.g. an entry of "10 out of 10" in order to recommend a site as a "must-see").

By enabling mobile device users to contribute to the database used to guide others around, the system can, advantageously, respond to changes over time. For example, a temporary attraction at a location not previously on the database can be tagged or flagged up by users as they encounter it, so enabling others to be directed to it. Similarly, a new restaurant can be tagged by users and so recommended to others. Similarly, the database can evolve as opinions on particular places change. A deteriorating restaurant may thus disappear from the database as recommendations of it decline over time. Conversely, an improving restaurant can pull in mobile device users from an increasing range as the database receives more and more recommendations.

In embodiments of the present invention where mobile device users are able to make entries to the navigation database, the system further includes database management means adapted to make corresponding entries in the database in response to receiving the respective transmitted data from the or each mobile device. In certain embodiments of the present invention, the corresponding entry made by the management means includes data indicative of a time of receipt of the transmitted data. In other words, the entry or update made to the database may be time-stamped. This time information can be used by embodiments in a variety of ways. For example, this time information can be used by the processing means in determining which place or places from the database to select; the predetermined range around a particular place may be determined by the number of entries or flags set for that location within a predetermined period, such as within the last week or month. Thus, entries made before that time may effectively be ignored. In certain embodiments of the present invention, the database management means may be adapted to delete or ignore database entries after a certain time has elapsed. In this way, the system is able to respond to changes (as discussed above), so that mobile device users are given directions that reflect the current, or at least recent, state of the environment.

In certain embodiments of the present invention, the system includes a plurality of mobile devices, each mobile device being operable to make entries in the database as defined above, and to provide a respective user with an indication arranged to direct the user to the respective selected place from the respective current location. Thus, many users of mobile devices are able to contribute to the database and derive benefit from the database, in the form of being directed to locations tagged or flagged by others.

In certain embodiments of the present invention, the database is arranged to record the number of entries made corresponding to each location (i.e., place). This number of entries, which could also be referred to as tags, flags or hits, can be used to determine the range or area of influence of that place. In other words, the greater the number of tags (which are, of course, recommendations) the larger the area within which a user can be automatically directed to the place.

Another aspect of the present invention provides a navigation method for guiding a user of a mobile device to a plurality of places, the method including storing a database including a plurality of records, each record including location data indicating of a location of a respective place; determining a current location of the mobile device; using the database and current location to select, according to at least one predetermined criterion, a place to direct the user of the mobile device towards; and using the mobile device to provide the user with an indicator to direct the user to the selected place. This method may further include one or more features corresponding to the optional navigation system features discussed above.

For example, the method may further include providing, with the mobile device, a user with an option to make an entry, corresponding to said current location, in the database; operating input means of the mobile device to select said option; and in response to a user selecting said option, transmitting data from the mobile device for remote reception and entry into the database, the transmitted data including location data indicative of said current location.

The method may further include receiving a transmitted data and updating the database using at least a portion of the transmitted data. For example, the transmitted data will typically include location data indicative of the current location of the mobile device. If the database does not yet contain an entry for that location then the location data will be entered. However, if the database already contains a record corresponding to that location, the database may be updated with just the additional data containing the transmitted message, for example if the message contains a new category for that location. Another alternative is that both the category and location data are already contained in the database, in which case the database may simply be updated to indicate that yet another user has tagged that location (and that entry may also be time-stamped). Similarly, the method may further include receiving the transmitted data and entering at least a portion of the transmitted data into the database.

Another aspect of the present invention provides a mobile device including a location determination means adapted to determine a current location of the mobile device; a user interface means adapted to provide a user with an option to make an entry, corresponding to said current location, in a database; and a input means operable by a user to select said option, wherein the mobile device transmits, in response to a user selecting said option, data for remote reception and entry into a database, the transmitted data including location data indicating the current location.

This mobile device may again include one or more of the optional features described above in relation to the other aspects. For example, the mobile device may be further adapted to provide a user with an indication to direct the user to a selected location from a current location.

Another aspect of the invention provides a method of operating a mobile device, the method including operating the mobile device to determine a location of a place to which the mobile terminal has been taken; providing, by the mobile device, a user with an option to create an entry, corresponding to said place, in a database; operating an input means of the mobile device to select said option; and transmitting data from the mobile device for remote reception and entry into a database, the transmitted data including location data indicating the current location.

Again, the method may further include one or more of the optional features described above in relation to the other aspects. For example, the method may further include providing, with the mobile device, a user with an indication arranged to direct the user to a location from the current location.

Another aspect of the present invention provides a method of generating a database for use in a navigation system for guiding a user of a mobile device to a plurality of places, the method including determining the location of a place to which the mobile terminal has been taken; and using the mobile device to make an entry in said database, the entry including location data indicating the location of the place.

In certain embodiments of the present invention, the entry includes additional data, for example category data indicative of a category allocated to the place by the user.

The method may further include taking a plurality of mobile devices to a plurality of places, determining the respective location of each place, and using each of the plurality of mobile devices to make a respective said entry in the database. In other words, the database may be built up or constructed, at least in part, from feedback provided by a large number of mobile device users.

Another of the present invention provides a database generated using a method as defined above, and further another aspect of the invention provides the use of such a database to guide a user of a mobile device to a place. Another aspect of the invention provides a computer program including instructions arranged, when executed, to implement the above-described methods. Another aspect of the invention provides a machine-readable storage for storing a program as defined above.

Referring now to FIG. 1, a navigation system embodying the invention includes a plurality of mobile devices 1a, 1b, 1c (in this example, the mobile devices 1a, 1b, and 1c are in the form of mobile phones), a base station 3, having a transmitter/receiver antenna 31, and a control unit 2. The mobile devices and base station are adapted to communicate wirelessly with one another via radio signals indicated generally by arrow 100. The base station is connected to the control unit 2 by means of a communication link 32 such that the base station can relay data received from the mobile devices 1a, 1b, and 1c to the control unit 2, and can send signals from the control unit 2 to the mobile devices 1a, 1b, and 1c. The control unit 2 includes a main memory or storage means 21 storing a database including a plurality of records, each record including location data indicative of the location of a respective place P within a region (the region in this example is a city, having a boundary generally indicated by the broken line in FIG. 1). The control unit 2 includes a processing means 22 adapted to use the database stored in storage means 21 and information indicating the current locations of various mobile devices to select, according to at least one predetermined criterion, a place P to which the user of each mobile device is directed. The control unit also includes an additional memory or storage 23 for storing a user preferences database, which is a database containing data indicating preferences set or registered by the respective users of the mobile devices 1a, 1b, and 1c. The processing means is adapted to use these preferences together with the main database from storage means 21 to determine places to which each user is directed. In this first example, each mobile device 1a, 1b, 1c is adapted to determine its own current location from signals received from a global navigation satellite system. Each mobile device 1a, 1b, and 1c thus includes a GNSS receiver and a GNSS processing means. Each mobile device 1a, 1b, and 1c is further adapted to transmit location data indicating the current location to the base station for relaying to the control unit. Thus, the navigation system knows the location of each mobile device 1a, 1b, and 1c at a particular time.

The main database according to this embodiment of the present invention includes a plurality of records (in this example, six records) each record corresponding to a respective one of five places P1-P5 within the city. The contents of the database are shown in FIG. 2. As can be seen from FIG. 2, each record identifies the place, contains location data indicative of the location of a corresponding place, contains data indicative of a category allocated to the corresponding place, and also contains time data (i.e., a time stamp) indicative of the data/time at which the particular record or entry was made in the database. In this first example, four categories are used to categorize the places: category "a" corresponds to bars; category "b" corresponds to restaurants; category "c" corresponds to hotels; and category "d" corresponds to museums. As can be seen, there are two records or entries in the database for a place P1. The location data for each of these first two entries is the same, but in the first entry place P1 has been placed in category a indicating that a bar can be found there; this entry was made at time T1a. The second entry for place P1 indicates category b, so a restaurant can also be found at P1. This second entry was made at a different time, T1b. It should be noted that the database also includes space for the entry of comments to accompany the location and category information, but use of this space is not mandatory.

The processing means 22 is adapted to use the main database in storage means 21 and the current location of a particular mobile device to select, according to at least one predetermined criterion, a place to direct a user of that particular mobile device. In the case of mobile device 1a, a user has not set or registered any preferences, and the system is adapted simply to direct the user to a place in the database that is closest to the current location of mobile device 1a. In the illustrated example, the closest place corresponds to place P1. The control unit transmits data indicating the location of place P1 to mobile device 1a, and mobile device 1a is further adapted to provide an indicator to direct the user to the selected location P1. Mobile device 1a includes a screen 11a, and the indicator is in the form of an arrow 12a displayed on the screen 11a pointing in the general direction of place P1. In certain embodiments of the present invention, in order to be able to display such a direction indicator, each mobile device includes a compass for instantaneously determining an orientation of the mobile device.

By contrast, the user of mobile device 1b has registered preferences. The user has requested not to be directed to category a places (i.e. bars), and has asked to be directed to category b (i.e., restaurants) and category c (i.e., hotels) locations. Thus, although mobile device 1b is closest to place P3, the processing means takes into account the registered preferences and selects place P2 as the nearest place in category b or c to direct the user of device 1b to. Accordingly, the control unit sends data indicating the location of place P2 to mobile device 1b, which displays an arrow 12b on its display 11b to direct the user to place P2.

Lastly, the user of device 1c has registered a preference with the system that device 1c should only be directed to category b locations (i.e., restaurants). The system has determined that place P2 is the closest place to the current location of device 1c and hence device 1c is displays a directional indicator 12c on its display 11c directing its user to P2.

In certain embodiments, the mobile devices may be unable to influence or alter the contents of the database stored in storage means 21. However, in alternative embodiments, the mobile devices are able to contribute to the database, and providing an advantage of allowing the database to be built up with data fed back from mobile device users so that the users can each benefit from each others' shared experiences.

For example, in the system shown in FIG. 1, each mobile device 1a, 1b, 1c is further operable to tag or flag up a particular place or location (i.e., make an entry in the database for that location or place). To tag or flag the particular place or location, each mobile device includes a user interface means adapted to provide a user with the option to make an entry for the current location in the database. The device also includes an input means operable by a user to select this option, and when the option is received, the mobile device is adapted to transmit data to the base station. This transmitted data can be entered into or otherwise used to update the database, and the transmitted data includes location data indicating the current location of the mobile device making the "tag". For example, a user of mobile device 1a may go to a location within the city and find a small museum that the user finds particularly interesting. At the location of the museum, the user is able to operate the mobile device 1a to transmit a flag corresponding to that the museum's location to the database. In addition to providing the location data indicating the location of the small museum to the database, the user may also operate the mobile device 1a to send category information to be stored along with the location data, as well as other data, such as data indicating a rating given to the small museum by the user. In this way, the database may build up a library of location data and associated information based on mobile device user experiences. The way that this data is used is very flexible, and can be tailored to suit individual preferences to create a better user experience. For example, a particular mobile device user may specify preference to be directed only to places or locations given the highest possible user ratings, e.g. 10 out of 10 "must-see" museums or attractions, or the best restaurants.

Figure 3:
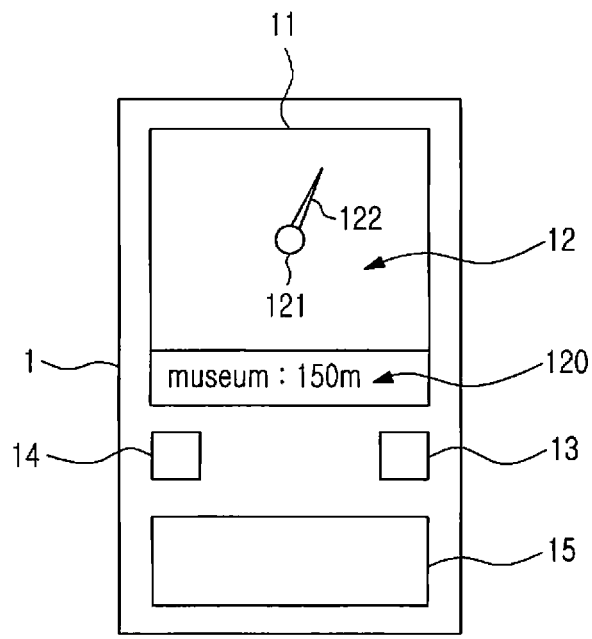
FIGS. 3, 4, 5, 6 and 7 are respective views of a mobile device providing information to a user according to an embodiment of the present invention.

FIG. 3 shows a mobile device embodying the invention and that also may be used in navigation systems and methods embodying the invention. The mobile device may also be used in the method of generating a database in accordance with another aspect of the invention. The mobile device 1 in this example is a mobile phone having a wireless telecommunications capability along with a GPS receiver. The phone 1 has a screen or display 11 and input means 13, 14, and 15 in the form of a plurality of keys. In other embodiments of the present invention, different input means may be employed, for example soft keys, touch sensitive regions, touch pads, a touch sensitive screen etc. The input means in this example includes one key 13 that a user may press in order to input a database entry corresponding to the current location (i.e., the key 13 can be pressed to tag or flag the current location (or equivalently, a place at the current location)). In certain examples, pressing the input key 13 may be all that is required from the user to flag the particular location, resulting in a signal, being sent from the phone that includes data indicating the current location. The location information can then be entered into an appropriate database. For example, if the location has not been flagged or tagged before, or if the location has already been tagged, the database can be updated to reflect the fact that the location has received another tag or flag (in effect a recommendation by the mobile phone user). In certain embodiments of the present invention, operation of the input key 13 initiates a tagging process which, in addition to eventually transmitting location data from the mobile phone, also enables the user to enter or select additional data to be associated with the location, such as a category, comments, or rating. Thus, in certain embodiments of the present invention, the initial operation of the input key 13 can result in the user then being given the option to enter or select further information to associate with the particular current location. In order to enter or select this additional information, the user can operate other portions of the input means, for example a plurality of other keys that are indicated generally by reference number 15 in FIG. 3. These additional keys 15 could be used, for example, to enter text information for the current location being tagged or flagged.

Thus, the mobile device shown in FIG. 3 can be used to tag locations, i.e., set tags or flags in a navigation database corresponding to certain locations, and that database may then be accessed by other mobile phone users.

The input means of the mobile device 1 in FIG. 3 also includes another key 14 which, when pressed, selects or turns on the automatic guidance or direction function of the phone. Thus, when key 14 is pressed, the screen 11 of the device 1 provides the user with a visual indication to direct the user to a place selected from a navigation database according to at least one predetermined criteria. This selection process may, as described above, be performed at least partly by processing means in the mobile phone itself, or may be performed by processing means external to the mobile device, the selected place information then being communicated to the mobile device by suitable means (such as wireless radio communication). The indicator 12 for directing the user in this example includes a plurality of components. Generally, in the centre of the screen, a circular portion or spot onto one whose size is indicative of the proximity of the place or location to which the user is being directed is displayed. Generally, the size of the spot increases as the closer the user's current location becomes closer to the "target" location. The indication 12 also includes a line, pointer, or arrow 122 extending from the central spot 121 in a direction that generally indicates a direction of the target location from the current location. Thus, to arrive at the automatically selected target location, the user of the mobile phone simply follows the arrow or pointer component 122. The orientation of the arrow 122 and the size of the spot 121 may change over time as the user navigates towards the target location. In this example, the indication 12 provided to the user also includes a textual component 120 displayed on a lower portion of the screen. In this example, the textual component provides more information about the nature and proximity of the target location, and indicates that the location is a museum 150 meters away.

Figure 4:
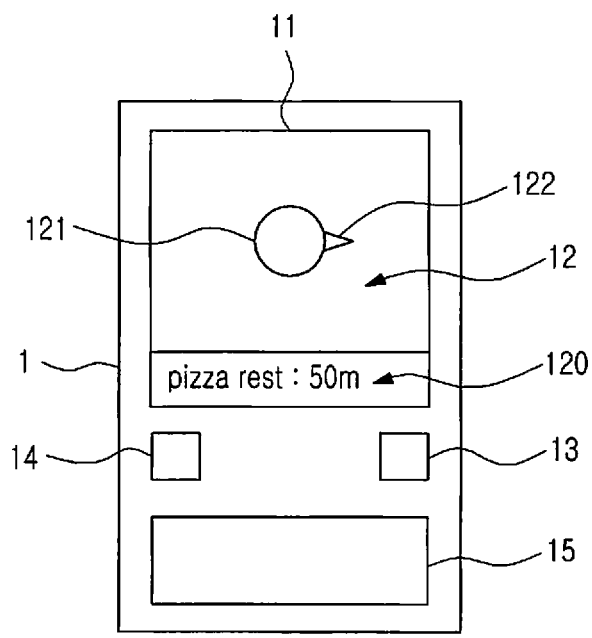

FIG. 4 shows the mobile device 1 of FIG. 3 in another situation, where the user has set preferences so that the navigation system can direct the user to restaurants. Here, the indication 12 includes a relatively large central spot 121 and a directional arrow 122, showing that a restaurant is relatively nearby. The textual component of the indication provides further information, namely that the restaurant is a pizza restaurant just 50 meters away.

Figure 5:
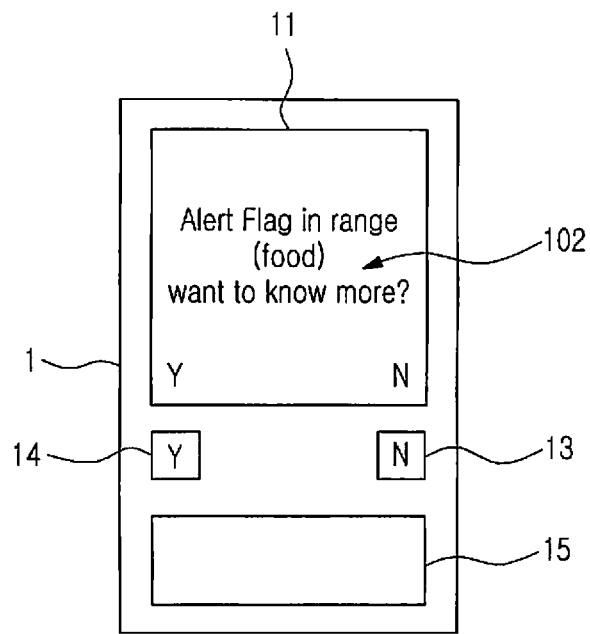

FIG. 5 shows a mobile phone 1 of the same general type as the phone illustrated in FIGS. 3 and 4, but operating in a slightly different manner. Here, the phone 1 and its corresponding navigation system have been configured so that, rather than automatically selecting a place from the navigation database and providing the user with directions to the place from the user's current location, the system instead provides the user with an alert on the screen 11 of the device to let the user know that a tagged or flagged place or location is nearby (i.e., within a particular range). In this example the alert informs the user that a flagged location is in range (and this range may have been preset by the user), but the flag relates to "food" (i.e. the flag corresponds to an eating establishment), and the screen prompts the user to indicate whether more information is requested. In this example, key 13 has been allocated as the "no" key, and key 14 has been allocated as the "yes" key. If the user operates key 13, then the alert simply disappears from the screen, but if the key 14 is pressed, the screen may then be arranged to display an indicator directing the user to the flagged location to which the user has just been alerted.

Figure 6:
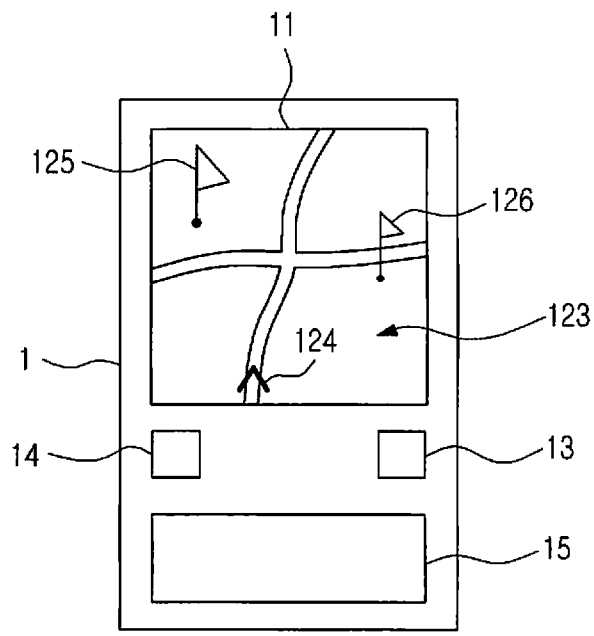

FIG. 6 illustrates a mobile device according to an embodiment of the present invention similar to the general type shown in FIGS. 3, 4 and 5. Here, the display (or screen) 11 of the device is configured to direct the user to tagged locations in a slightly different manner. In the example illustrated in FIG. 6, the user registered with the navigation system, thought the phone 1, that the user only wishes to be directed to recommended art galleries. The navigation system has then searched its database for recommended art galleries in the vicinity of the user's current location and has transmitted the locations of those galleries to the mobile device, along with an indication of how highly the galleries have been recommended (this indication can, for example, be based simply on a number of recommendations, or may be more sophisticated, taking into account the average rating given to the gallery by users making corresponding entries on the database). This information received from the navigation system is then displayed on the mobile device display 11. The display 11 provides the user with a simplified map 123 of the user's current environment, with the user's position and current direction being shown as an arrow 124. On this simplified map 123 flags 125, 126 are displayed indicating the positions of only recommended galleries in the displayed portion of the map. The size of each flag gives an indication of how highly the corresponding museum (or gallery) has been recommended. Thus, the user can instantly see in the illustrated example that the gallery indicated by flag 125 is more highly recommended than the gallery indicated by flag 126. This simple graphical representation provides the user with an easy way to visit highly recommended places of the category in which the user has registered an interest.

Figure 7:
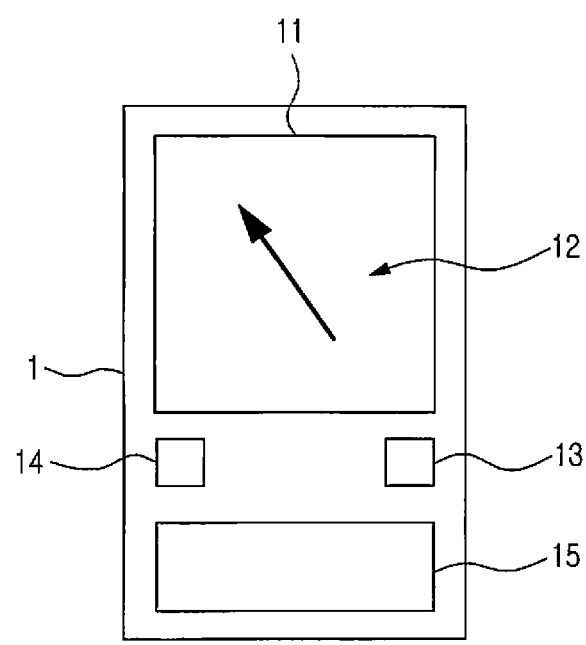

FIG. 7 shows another mobile device 1 operating as part of a navigation system according to an embodiment of the invention. Here, the user has selected a "mystery tour" mode, in which the navigation system automatically guides the user to a series or sequence of places/locations without providing the user with any information in advance regarding what those places or attractions are. The system as a whole simply monitors where the mobile device 1 is at a particular time, and selects a "next" location automatically from the database according to at least one criterion. The user is then provided with a simple indication 12 in the form of an arrow to guide the user to the selected next location. In this particular example the arrow 12 tells the user in which direction to move only, and does not gives any information as to how far the next location is or what can be found at the next location. This kind of system can provide the user of a mobile device with an entertaining means of exploring an environment with which the user may not be familiar.

Figure 8:
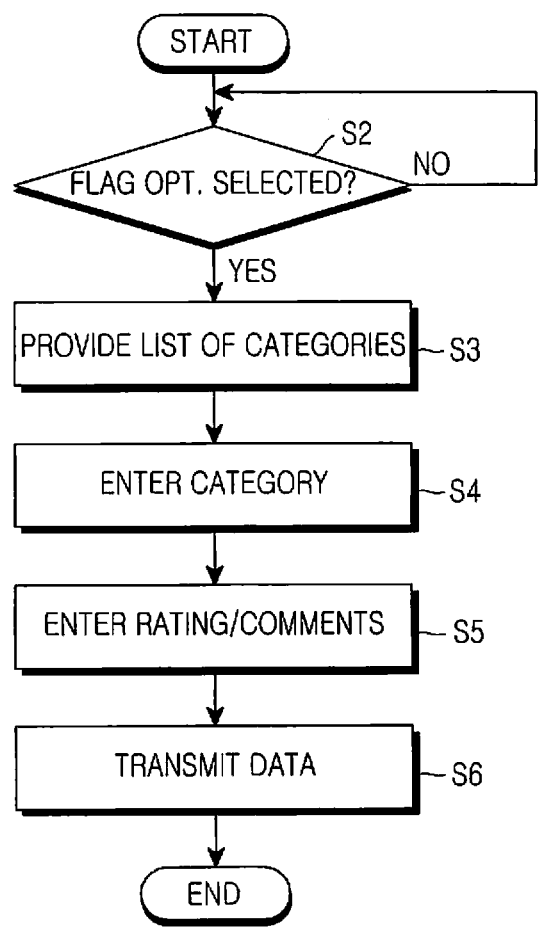
FIG. 8 is a flow chart illustrating part of a method embodying the inventions.

FIG. 8 shows a method of entering a flag for a particular location using a mobile device. The method can also be referred to as a tagging method or part of a method for generating or updating a database. In step S2, the mobile device determines whether a flag option has been selected by a user of the mobile device (e.g., whether the user has operated an input means to indicate that the user wishes to flag or tag the current location). If the flag option has been selected, the method proceeds to step S3, in which the user is provided with a list of categories that may be associated with the current location. In step S4, the user enters at least one category for the current location. In step S5, the user is able to enter additional information, for example a rating or comments on the place at the current location. In step S6, data is transmitted from the mobile device for remote reception and use in generating or updating a database. The transmitted data includes location data indicating the current location of the mobile device, together with information regarding the category or categories selected by the user and any additional information.

Figure 9:
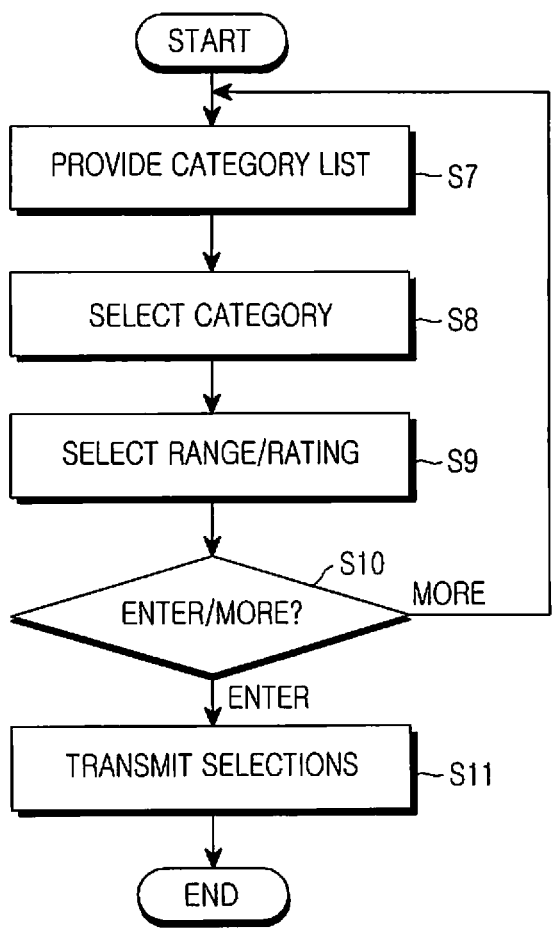
FIG. 9 is a flow chart illustrating another part of a method embodying the invention.

FIG. 9, is a flow chart illustrating a method according to embodiments of the present invention wherein a user registers preferences that a navigation system may use when selecting places to direct the user to, from a database. The user is provided with a list of categories in step S7. This is a list of categories of places or locations that the user might be interested in. In step S8, the user selects one of these categories to indicate that the user would like to be directed to locations or places within that category. In step S9, the user is able to select or enter a range or rating to be associated with the selected category. By selecting or entering a particular range to notify the system that the user wishes to be directed to locations or places within the selected category, but only within that range of the user's current location. By providing the system with rating information, the user can additionally request to be directed only to places or locations in the selected category, which are within the selected range, and which meet the specified rating (i.e., level of recommendation). For example, a user may follow the method shown in FIG. 9 to request directions to restaurants within 500 meters of the user's current location that have been given an average rating of at least 8 out of 10. In step S10, the user is given the option to either transmit the selection data from the mobile device or to add more data by selecting a further category or categories, and associated range or rating information. Finally, in step S11 the mobile device transmits data for remote reception. The transmitted data can then be used to generate or update a user preferences database, for example the database stored in storage means 23 of the navigation system of FIG. 1.

Figure 10:
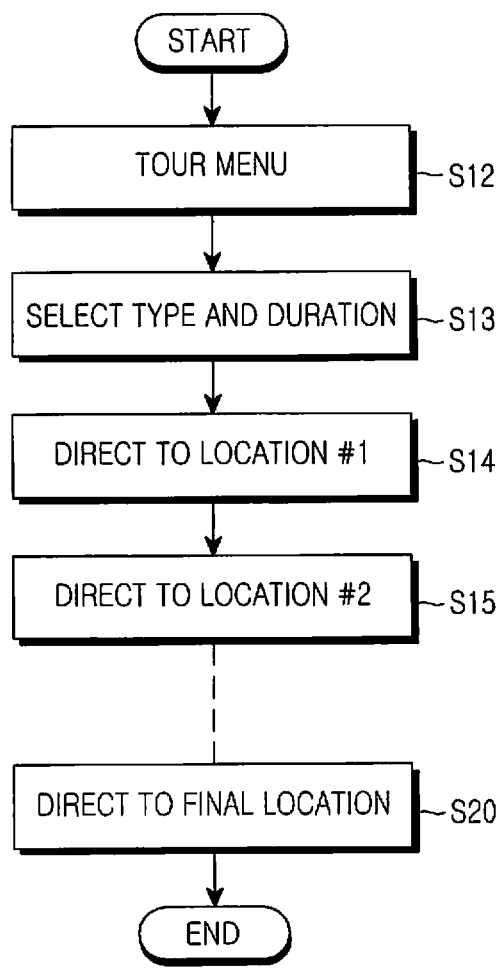
FIG. 10 is another flow chart illustrating another part of a method embodying the invention.

FIG. 10, is a flow chart illustrating part of a navigation method in accordance with another embodiment of the present invention. The user of a mobile device is provided with a tour menu in step S12. In step S13, the user selects a type of tour and a desired duration of that tour. Then, the user is automatically directed to a series of locations in steps S14 to S20, those locations having been selected from a navigation database according to an embodiment of the present invention using the start location of the user and predetermined criteria including the type of tour selected and the duration. For example, a user may have selected an architecture tour, lasting two hours. The system is then able to select tagged locations of architectural interest from the database, with (the number of places selected and their locations) determined by the start location and the desired duration of the tour.

The present invention provides a mobile navigation application to tag locations and also to find locations tagged by others, and may further provide a user-initiated feedback/tagging application for locations in an environment such as a city, coupled to a pedestrian navigation system.

The present invention enables users to share locations that they find interesting with other users. The present invention further enables users to share locations by two simple actions on their mobile phone, namely choosing to tag a location, and then assigning a category to the tag (for example, assigning one of three categories), thereby providing a simple and convenient interface to share travel information with others. Thus, the present invention lowers the threshold to share travel information.

The present invention also provides users with an unobtrusive, intuitive and explorative interface. For example, a user can be directed towards a location of interest, simply by means of an arrow on the screen of the user's mobile device. The information in certain embodiments is kept simple, challenging the user to explore without other assistance.

The present invention enables users to explore cities and other locations by indirectly using the feedback of other users, but at the same time providing users with the opportunity to share their own experiences. In this way, the present invention provides a lively and dynamic way of exploring environments.

Figure 11:
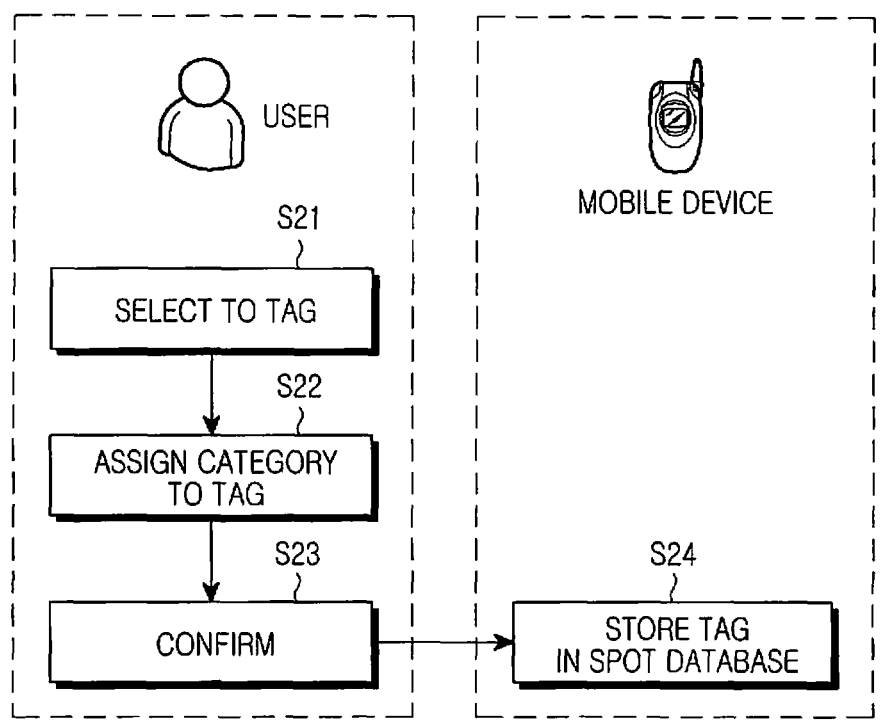
FIG. 11 is a schematic representation of steps involved in setting or placing a tag in a method according to an embodiment of the present invention.

FIG. 11, is a schematic illustration of some of the steps involved in the placing a tag through methods according to embodiments of the present invention. A user may first select a tagging option in step S21, and then may assign a category to the tag in step S22. In this example, the user is able to assign one of three categories: (1) "eat and drink"; (2) "buy"; and (3) "see". The user confirms the selections in step S23, and then in step S24, the tag is stored by the mobile device in a database, which shall be referred to as a "spot database," in that the database contains information on "spots" or places that have been tagged by the user and indeed other users of mobile devices. The tag contains the following information: the co-ordinates of the tagged location; the date on which the tag is made or entered in the database; and the category assigned to the tag. The mobile device may store the tag in a spot database held in the mobile device's own memory, or may transmit the tag information to a remote database stored externally.

Figure 12:
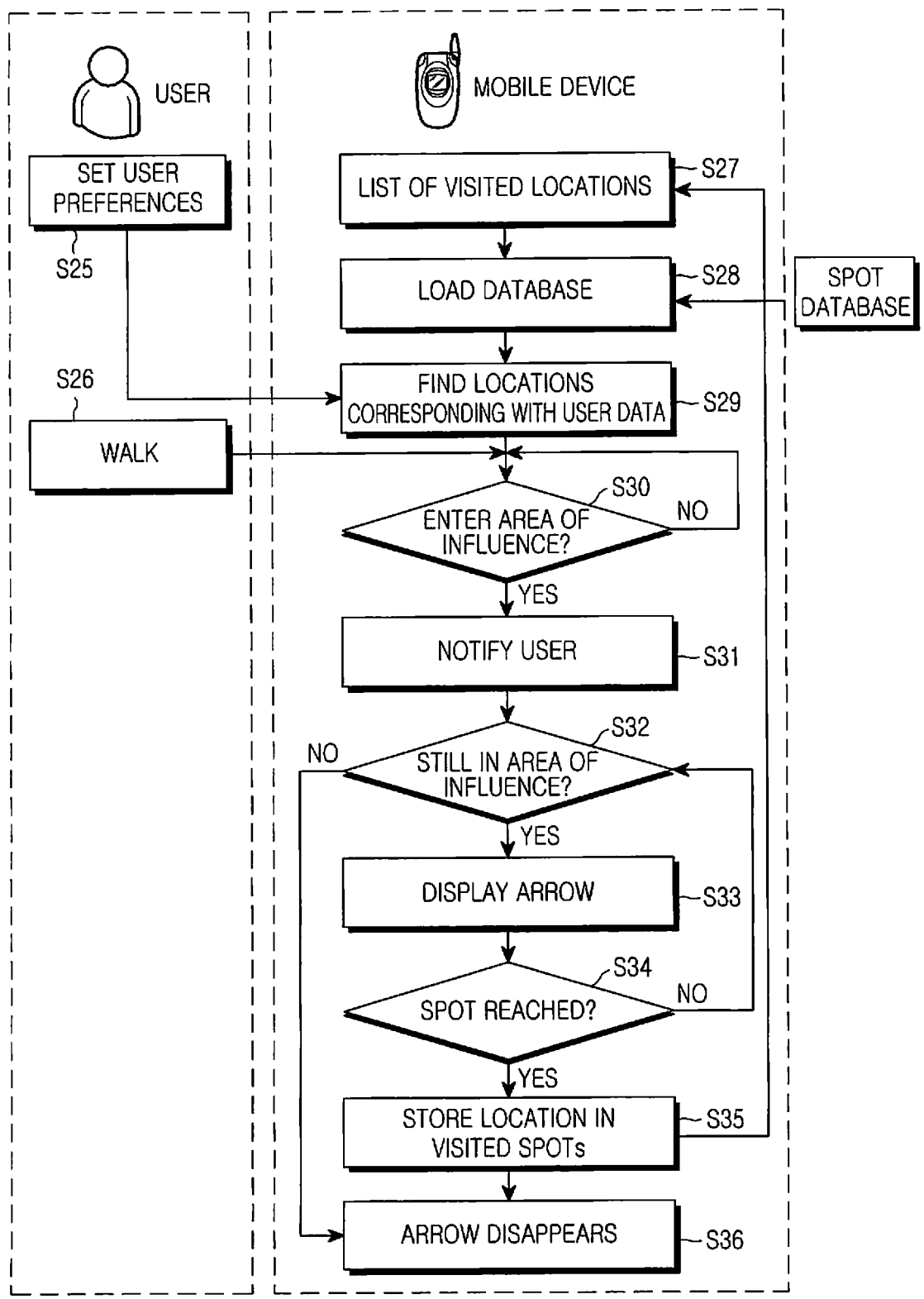
FIG. 12 is a schematic representation illustrating steps involved in a method using a spot database according to an embodiment of the present invention.

FIG. 12 illustrates steps in another method according to an embodiment of the present invention. In step S25, a user sets preferences. In this example, the user preferences are a category and a number of times a spot (i.e., particular location or place) has been tagged. The system stores the information in a spot database, which serves several purposes. The spot database tracks all locations that have been tagged, calculates the size of the area of influence for a particular spot according to the number of tags that have been placed on a certain spot (the area generally increasing as the number of tags increases), merges areas of influence when spots are close and in the same category, and deletes tags after a certain amount of time. In step S27, the mobile device maintains a list of locations visited by the mobile device. In step S28, the mobile device loads the database (i.e., the mobile device can download all or part of the spot database for directing the user). In step S29, the mobile device uses processing means to find locations within the loaded database that correspond with the user data (i.e. correspond with the preferences set by the user). In other words, the mobile device searches for tagged locations that are in the category or categories selected by the user and have been tagged (i.e., recommended) by at least the minimum number of users specified by the current user. The user may then carry the mobile device around the user walks around an environment, in step 26. As the user moves around the environment, the mobile device, in step S30, determines whether the user has entered an area of influence corresponding to one of the identified (i.e., selected) locations from the database. The area of influence for a particular location may itself be a function of the number of times that location has been tagged, or indeed of other factors. In the illustrated embodiment, if the user has entered an area of influence, the mobile device notifies the user, in step S31. For example, the user may be notified by means of a vibration and/or a sound signal, and/or by a visual indication on the mobile device display. If it is determined that the user is still in the area of influence, in step S32, then a guiding arrow is displayed on the user's mobile device in step S33. In certain embodiments the displayed arrow may have a component that increases in its displayed size as the distance between the user and the spot to which the user is being directed decreases. For example, this component may be a circle or spot at the base of the arrow. In step S34, it is determined whether the selected spot has been reached. If the spot has not been reached, and the user is still in the area of influence of that tagged spot, the arrow is still displayed. The direction and size of the arrow change in response to movement of the user. Alternatively, if the spot has been reached, the mobile device may store the current location in the database of visited spots or locations. Finally, the arrow that was directing the user to the spot may disappear in step S36.

Embodiments of the present invention can be realized in the form of hardware, software or a combination of hardware and software. Any such software may be stored in the form of volatile or non-volatile storage such as, for example, a storage device like a Read Only Memory (ROM), including erasable or rewritable as well as non-rewriteable, or in the form of memory such as Random Access Memory (RAM) and memory chips, integrated circuits, or on an optically or magnetically readable medium such as a Compact Disc (CD), a Digital Versatile Disc (DVD), or a magnetic disk or tape, etc. The storage devices and storage media are embodiments of machine-readable storage that are suitable for storing a program or programs including instructions that, when executed, implement embodiments of the present invention. Accordingly, embodiments according to the present invention may provide a program including code for implementing a system or method according to the present invention. Such programs may be conveyed electronically via various mediums including a communication signal carried over a wired or wireless connection.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

What is claimed is:

1. A navigation system for guiding a user of a mobile device to a plurality of places, the system comprising:
    a storage means for storing a database comprising a plurality of records, each record including location data indicating a location of a respective place;
    a mobile device;
    a location determination means for determining a current location of the mobile device; and
    a processing means for using the database and the current location to select, according to at least one predetermined criterion, a place to direct a user towards,
    wherein the mobile device is adapted to provide a user with an indicator arranged to direct the user to the selected place, and
    wherein the indicator is a single graphical indicator including a first graphical component having a size dependent upon a distance of the selected place from the current location and a second graphical component indicating a direction of the selected place from the current location.

2. The navigation system in accordance with claim 1, wherein the storage means is external to the mobile device.

3. The navigation system in accordance with claim 2, wherein the mobile device comprises additional storage means for storing a copy of at least part of the database.

4. The navigation system in accordance with claim 1, wherein the mobile device comprises a Global Navigation Satellite System (GNSS) receiver for receiving navigation signals from a plurality of satellites and a GNSS processing means for determining the current location of the mobile device from the received navigation signals, the location determination means including the GNSS receiver and the GNSS processing means.

5. The navigation system in accordance with claim 1, wherein each of the records further includes category data indicating a category allocated to the respective place.

6. The navigation system in accordance with claim 1, wherein the at least one predetermined criterion include at least one of:
    information indicating whether a place is within a predetermined distance of the current location;
    information indicating whether the current location is within a predetermined distance of a place;
    information indicating whether the current location is within a defined area around a place;
    information indicating whether a place is within a particular category or categories;
    information indicating whether a place satisfies at least one preference set by a user of the mobile device.

7. The navigation system in accordance with claim 6, wherein the processing means is adapted to determine said defined area.

8. The navigation system in accordance with claim 6, wherein the mobile device is operable to set said at least one preference.

9. The navigation system in accordance with claim 1, wherein the mobile device further comprises:
    a user interface means adapted to provide the user with an option to create an entry, corresponding to the current location, in the database; and
    an input means operable by the user to select said option, wherein the mobile device is adapted, in response to the user selecting said option, to transmit data for remote reception and entry into the database, the transmitted data including location data indicating the current location.

10. The navigation system in accordance with claim 9, wherein the input means is further operable by the user to input or select additional data corresponding to the current location, the transmitted data including the additional data.

11. The navigation system in accordance with claim 10, wherein the additional data includes category data indicating a category allocated by the user to a place at the current location.

12. The navigation system in accordance with claim 9, further comprising a database management means for creating the corresponding entry in the database in response to receiving the transmitted data from the mobile device.

13. The navigation system in accordance with claim 12, wherein the corresponding entry created by the management means includes data indicating a time of receipt of the transmitted data.

14. The navigation system in accordance with claim 13, wherein the management means deletes an entry from the database a predetermined time after receiving transmitted data corresponding to the deleted entry.

15. The navigation system in accordance with claim 9, further comprising a plurality of the mobile devices, each mobile device for creating entries in the database providing each respective user with an indicator arranged to direct the respective user to the respective selected place from the respective current location.

16. The navigation system in accordance with claim 15, wherein the database is arranged to record a number of entries made corresponding to each place.

17. The navigation system in accordance with claim 16, wherein the processing means determines a respective defined area around each place according to the number of entries made corresponding to the location of each place, and to use the defined areas to select the place to direct the user towards.

18. The navigation system in accordance with claim 1, wherein the processing means selects the place to direct the user towards based on a number of recommendations or an average rating given to the selected place.

19. The navigation system in accordance with claim 18, wherein the selected place is indicated by a graphical indicator having a size dependent upon the number of recommendations or the average rating given to the selected place.

20. A navigation method for guiding a user of a mobile device to a plurality of places, the method comprising:
    storing a database comprising a plurality of records, each record comprising location data indicating a location of a respective place;
    determining a current location of the mobile device;
    using the database and the current location to select, according to at least one predetermined criterion, a place to direct a user of the mobile device towards; and
    using the mobile device to provide a user with an indicator to direct the user to the selected place,
    wherein the indicator is a single graphical indicator including a first graphical component having a size dependent upon a distance of the selected place from the current location and a second graphical component indicating a direction of the selected place from the current location.

21. The method in accordance with claim 20, further comprising:
    providing, by the mobile device, the user with an option to create an entry corresponding to the current location, in the database;
    operating an input means of the mobile device to select the option; and
    in response to the user selecting the option, transmitting data from the mobile device for a remote reception and entry into the database, the transmitted data including location data indicating the current location.

22. The method in accordance with claim 21, further comprising receiving the transmitted data and updating the database using at least a portion of the transmitted data.

23. The method in accordance with claim 21, further comprising receiving the transmitted data and entering at least a portion of the transmitted data into the database.

24. A mobile device comprising:
    a location determination means for determining a current location of the mobile device;
    a user interface means for providing a user with an option to create an entry, corresponding to the current location, in a database; and
    an input means operable by the user to select the option,
    wherein the mobile device transmits, in response to a user selecting said option, data for remote reception and entry into the database, the transmitted data including location data indicating the current location,
    wherein the mobile device provides the user with an indicator arranged to direct the user to a selected place from a current location, and
    wherein the indicator is a single graphical indicator including a first graphical component having a size dependent upon a distance of the selected place from the current location and a second graphical component indicating a direction of the selected place from the current location.

25. A method of operating a mobile device, the method comprising:
    determining, by the mobile device, a location of a place the mobile device has been taken;
    providing, by the mobile device, a user with an option to create an entry corresponding to the place, in a database;
    receiving, through an input means of the mobile device, a selection from the option;
    transmitting data, from the mobile device, for remote reception and entry into a database, the transmitted data including location data indicating of a current location; and
    providing, by the mobile device, the user with an indicator arranged to direct the user to a location from the current location,
    wherein the indicator is a single graphical indicator including a first graphical component having a size dependent upon a distance of the selected place from the current location and a second graphical component indicating a direction of the selected place from the current location.

26. A method of generating a database for use in a navigation system for guiding a user of a mobile device to a plurality of places, the method comprising:
    determining, by the mobile device, a current location of a place the mobile device has been taken;
    creating, by the mobile device, an entry in the database, the entry including location data indicating the location of the place; and
    providing the user with an indicator arranged to direct the user to a location from the current location,
    wherein the indicator is a single graphical indicator including a first graphical component having a size dependent upon a distance of a selected place from the current location and a second graphical component indicating a direction of the selected place from the current location.

27. The method in accordance with claim 26, wherein the entry includes additional data.

28. The method in accordance with claim 27, wherein the additional data includes category data indicating a category allocated to the place by the user.

29. The method in accordance with claim 26, the method further comprising:
   determining the respective location of each respective place to which a plurality of mobile devices have been taken; and
   creating, by each of the plurality of mobile devices, a respective said entry in the database.

* * * * *